Oct. 7, 1969 W. H. KUMMER 3,471,864
TRAVELING WAVE PHASE SHIFTER DIRECTION FINDER
Original Filed Sept. 15, 1967 4 Sheets-Sheet 1

INVENTOR.
WOLFGANG H. KUMMER
BY Harry A. Herbert Jr
Julian L. Siegel
ATTORNEYS

INVENTOR.
WOLFGANG H. KUMMER
BY Harry A. Herbert Jr
Alan L. Siegel
ATTORNEYS

INVENTOR.
WOLFGANG H. KUMMER

United States Patent Office 3,471,864
Patented Oct. 7, 1969

3,471,864
TRAVELING WAVE PHASE SHIFTER DIRECTION FINDER
Wolfgang H. Kummer, Santa Monica, Calif., assignor to the United States of America as represented by the Secretary of the United States Air Force
Original application Sept. 15, 1967, Ser. No. 668,250. Divided and this application Oct. 14, 1968, Ser. No. 767,199
Int. Cl. G01s 5/02
U.S. Cl. 343—118       2 Claims

ABSTRACT OF THE DISCLOSURE

A passive, broadband, direction finding system having an array of discrete radiating elements equispaced on the perimeter of a circle in which a suitable sector can be active at one time. Specially developed traveling wave phase shifter tubes are used in each transmission line connecting an antenna element to a summing feed circuit. Three controls are programmed in which the tubes are turned on and off depending on whether their elements are in use for the particular beam pointing direction at a particular instant. The other two controls program the appropriate time delay and tube gain to respectively point the beam in the desired pointing direction and achieve low side lobe levels.

CROSS-REFERENCE TO RELATED APPLICATIONS

This is a division of application Ser. No. 668,250, filed Sept. 15, 1967.

BACKGROUND OF THE INVENTION

This invention relates to a directional finding system and more particularly to a system using a circular antenna array together with traveling wave tubes.

The invention utilizes a specially developed traveling wave phase shifter tube which contains one additional electrode over the conventional traveling wave tube amplifier and is capable of simultaneous but independent gain and delay control. Because each tube in the direction finding system is controlled individually the elements can now be placed on a circle and need not be placed on a straight line as was necessary in the prior art which shared one traveling wave tube which was used only as a phase shifter. The former device consisted of a linear array of uniformly spaced elements which were coupled successively along the length of the input helix of a traveling wave tube. One of the electrodes was modulated, producing a variable progressive time delay between antenna elements thereby scanning the beam. With a desired delay variation an undesired gain variation also occurred. This invention, however, incorporates both gain and delay control arrays whereas in the past only delay control was used.

This system of the present invention is capable of scanning speeds up to 10,000 times as fast as former devices such as the mechanical Wullenweber array. The Wullenweber device consisted of arrays of elements uniformly spaced about a circle on a circular cylindrical surface and each element was connected to a rotating mechanical feed structure located in the center of the cylinder and one or more of the elements was used at one time. As the feed structure rotated the beam rotated. Because of the rapid scanning rate, this invention has a faster average acquisition time for targets than the mechanical equivalent.

SUMMARY OF THE INVENTION

The purpose of the invention is to produce electronically scanning antenna that scans an antenna beam 360° in azimuth either continually or in discrete steps and at variable, controllable, and in particular, rapid speeds, and can be used either for receiving or transmitting. The invention uses gain and delay control of a series of traveling wave tubes one each connected to a circular array of antennas.

It is an object of this invention to provide an electronic scanning antenna.

It is another object to provide a directional finding antenna system having low side levels.

It is still another object to provide a broadband directional finding system that can be rapidly scanned 360° in azimuth.

It is still another object to provide a traveling wave phase shifter directional finding system in which the delay and gain of the traveling wave phase shifter tube are simultaneously varied as the directional finding system scans.

It is still another object to provide a traveling wave phase shifting directional finding system in which pairs of antenna elements share each traveling wave phase shifting tube.

These and other advantages, features and objects of the invention will become more apparent from the following description taken in connection with the illustrative embodiments in the accompanying drawings, wherein:

DESCRIPTION OF THE PREFERRED EMBODIMENT

Figure 1:
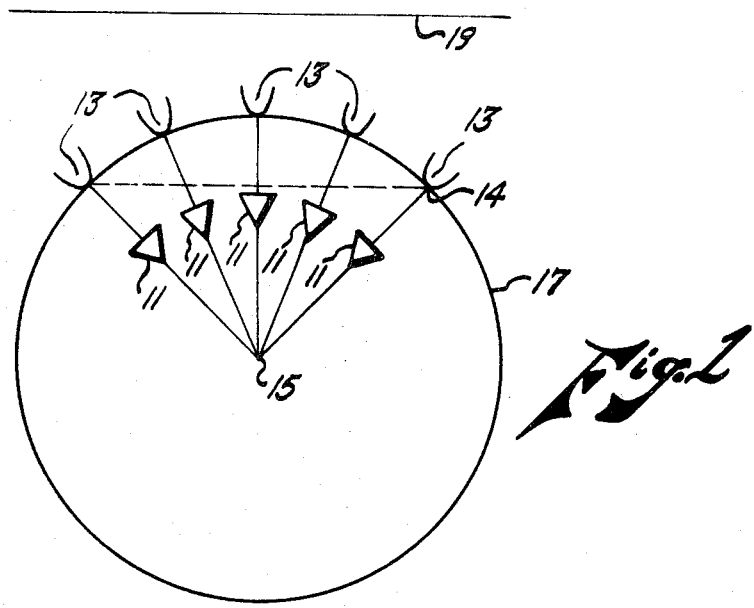
FIGURE 1 is a schematic drawing showing the system of the invention.

Referring to FIGURE 1, traveling wave tubes 11 are connected between the circular array of antenna elements 13 and common output port 15. The schematic shows only the active tubes for receiving a signal from a particular direction, however, the tubes are equally spaced about the whole circumference 17 and are controlled sequentially to rotate the beam. The time delay of each tube 11 is adjusted so that the total time delay from wavefront 19 to common output port 15 is the same for each path. This equal total-time-delay insures that signals from all antenna elements 13 add in phase at output 15 for all frequencies within the band of interest. The end tubes are adjusted to have less time delay than the center tube and are also reduced in gain to minimize the side lobe level; thus, minimum delay and minimum gain go together. The tubes intermediate between the center and end tubes have intermediate values of gain and time delay depending on the array dimensions. As the beam is scanned, the tubes assume different positions in the active part of the array. Thus, all tubes must be designed for the entire range of the required time delay. Basically, the traveling wave phase shifter (TWPS) tube is required to perform two functions: (1) to provide a variable time delay (phase shifter) and (2) to provide amplitude and gain control (electrically variable attenuator).

The design parameters for an array of circular disposed elements connected to a TWT phase shifter should satisfy requirements of beamwidth and side lobe levels for a particular range of frequencies. It is characteristic of this array that only a sector comprised of a fraction of the total number of elements is active at a given time and thus the beam formed may be scanned by appropriate modulation of the TWT phase shifter. The phase is so adjusted to give an effect of equal phase wavefront 19 parallel to cord 14 formed between the end elements which are active. The number of elements which form the active part of the array is determined by the beamwidth required, the size of the complete array, and the maximum delay available in one phase shifter. The beamwidth of this type of antenna is determined primarily by the cord length of the active sector upon which the antenna elements are located. Hence, the greater the diameter of the array and the greater proportion of the arc used, the narrower the beamwidth. The side lobe level of this type of antenna is determined by the spacing between the elements on the arc, by the curvature of the active sector, and hence by the total number of elements needed for the entire array. The lower the side lobe level desired, the closer the elements must be spaced, the smaller the amount of curvature of the active sector that can be used and the greater the number of elements that are needed for the total array.

Figure 2:
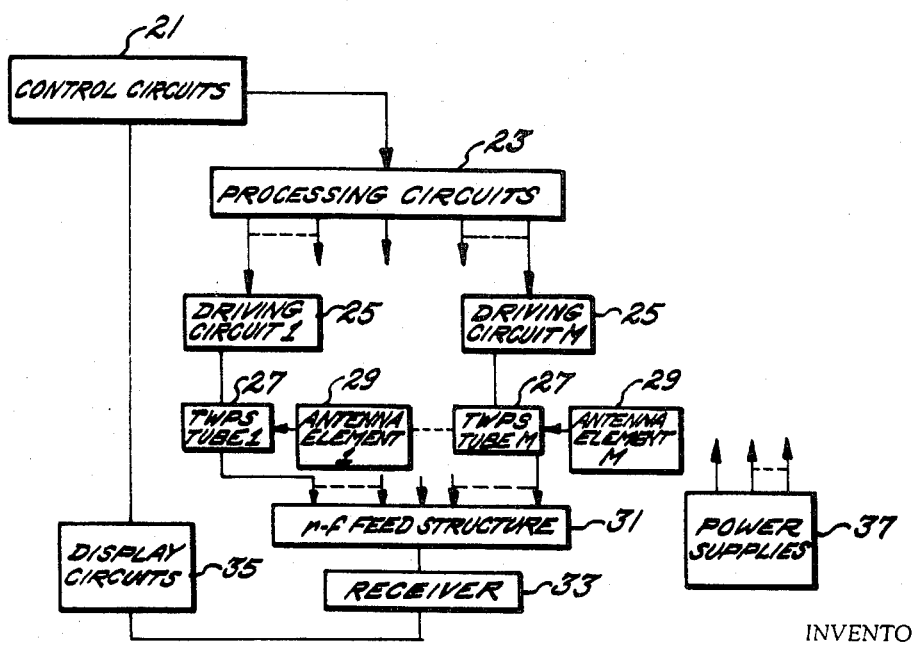
FIGURE 2 is a simplified block diagram of an embodiment of the invention.

Referring to FIGURE 2, control circuits 21 include actual control panels, from which the operator controls the beam mode, beam pointing direction, beam scanning sector, and beam scanning rate. These circuits contain beam pointing direction information which is converted in relationship to the angular location of each antenna element 13 by programming circuits 23. Driving circuits 25 convert this information into actual voltage setting on each (TWPS) tube 27. At the same time the RF signals enter each antenna element 29 and pass through the TWPS tube connected to each element. All RF signals are then combined in RF summing feed structure 31 and fed to receiver 33. The received signal strength is presented on display 35 along with the beam pointing direction obtained from control circuits 21. Power supplies 37 are necessary for the operation of all circuits and in addition furnish all static TWPS tube voltages.

The best display for a directional finder or radar is a visual display on a cathode ray tube (CRT). The present directional finder involves no frequency resolving receiver and as such the only information to be displayed is signal versus azimuth bearing angle which is displayed on the CRT as a polar plot. The presence of a signal causes the trace to move radially outward toward the periphery of the CRT. The response can be made logarithmic such that the deflection range corresponds to the dynamic range of the system. A marker can be divided on the display to increase the angular accuracy on readout.

Figure 3A:
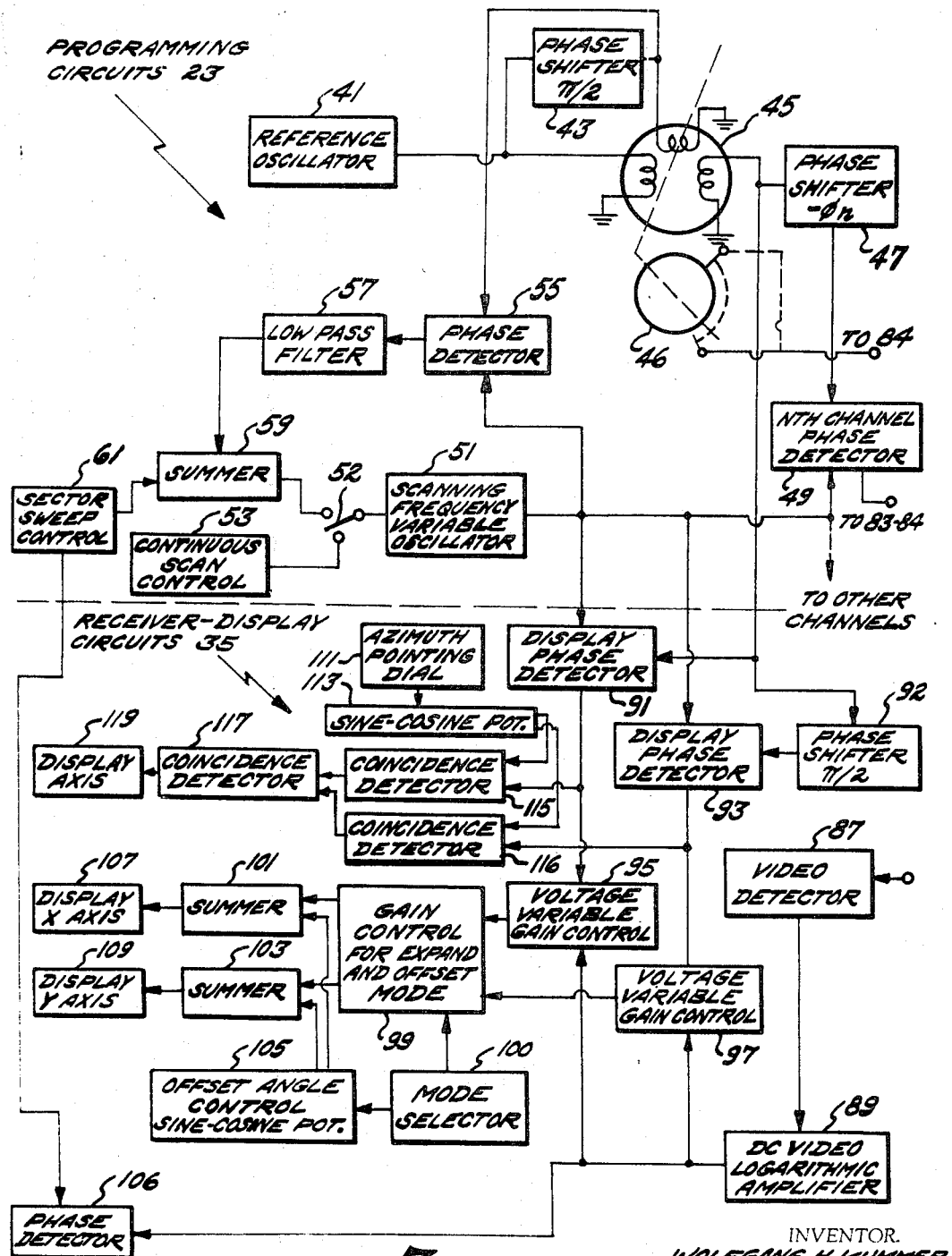
FIGURES 3a and 3b are a detailed block diagram of that shown in FIGURE 2.
Figure 3B:
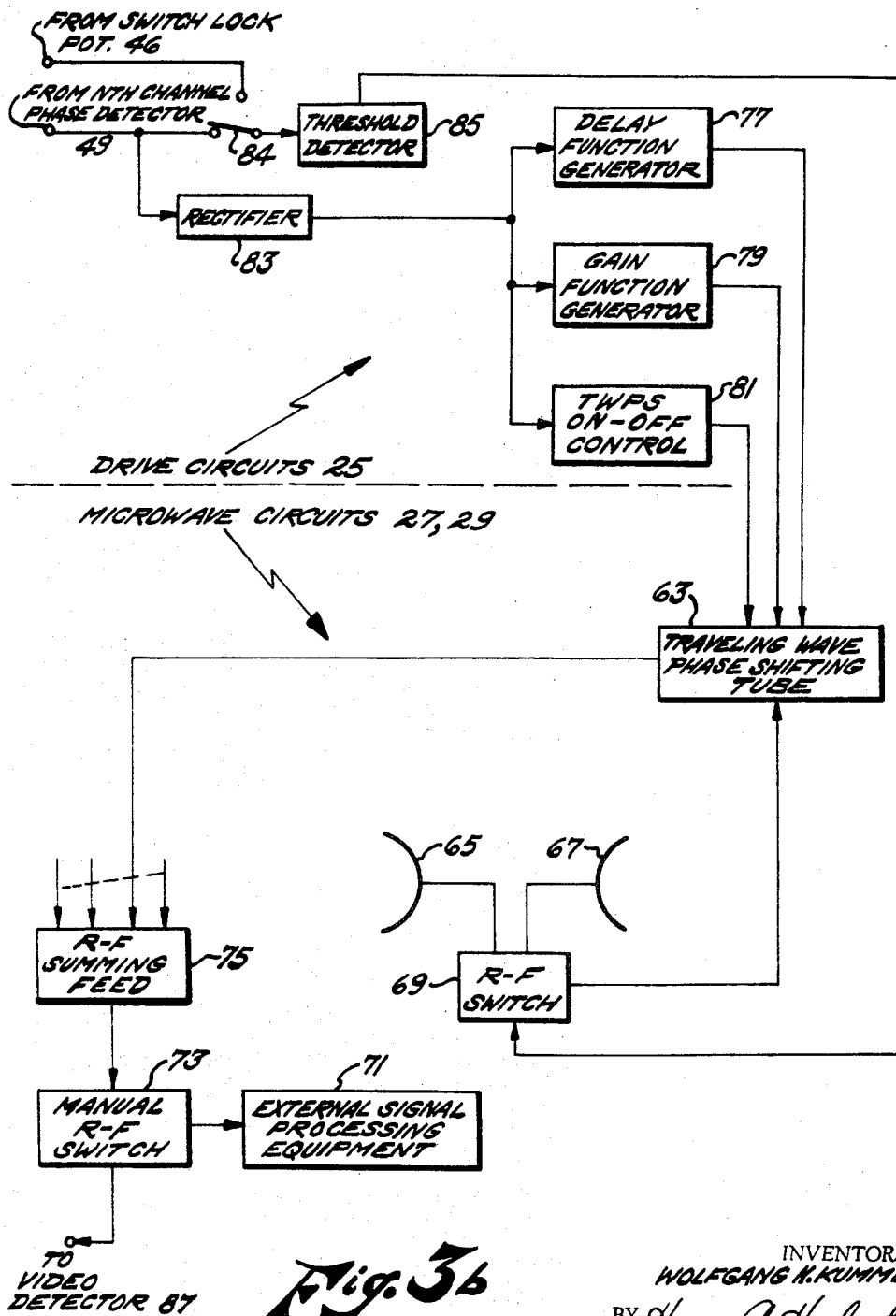

The control electronics which is shown in FIGURES 3a and 3b together with the microwave circuits may be separated into three groups of circuits: programming circuits, which determine what the settings for each TWPS tube should be at each instant; drive circuits, which at each TWPS tube convert the programming information to the actual tube electrode voltages; and finally the receiver-display circuits, which detect and give a visual display of the incoming information.

Since the time delay required at the $n$th antenna element is proportional to the cosine of the angular separation between the beam pointing direction ($\phi$) and the $n$th element angular location ($\phi_n$), the programming circuits generate cosine ($\phi-\phi_n$) for each $n$th tube of the total number in the system. This is accomplished by detecting the phase difference between two signals which will be described in this embodiment as having a frequency of 100 kc. One signal will have phase $\phi_n$ and the other, phase $\phi$. If the beam is scanning rather than stationary, then $\phi$ is a function of time or is a frequency offset.

Referring to FIGURE 3a, the 100 kc. reference signal is provided by stable 100 kc. oscillator 41 in which its phase is continually variable by resolver 45 in conjunction with $\pi/2$ phase shifter 43 and switch lock potentiometer 46. An output is produced having phase angle $\phi_0$. This 100 kc. reference signal now at an angle $\phi_0$ is distributed to separate phase shifter 47 for each of the channels where it undergoes a phase shift of $-\phi_n$. This phase shift is fixed but depends on the value of $n$, the number of antenna element pairs or TWPS tube it serves. The output of phase shifter 47 is 100 kc. at an angle of $\phi_0-\phi_n$ which is the reference signal at phase detector 49 serving the $n$th pair of antenna elements and the $n$th tube.

The second and nominal 100 kc. signal is obtained from the scanning frequency voltage control oscillator 51 which has a variable frequency output of 100 kc. at an angle of $\phi(t)$. Its output is of variable frequency because the phase angle $\phi(t)$ varies with time, constituting an instantaneous frequency offset. The signal is compared with the reference signal in the $n$th channel phase detector 49 to obtain a voltage proportional to cosine $(\phi(t)+\phi_0-\phi_n)$ which is the programming signal for the $n$th tube. The instantaneous beam pointing direction is $\phi(t)+\phi_0$ and the angular location of the $n$th pair of elements is $\phi_n$.

For the continuous scanning case, voltage control oscillator 51, as controlled by continuous scan control 53, is free running at a frequency which can be set from slightly less than 100 kc. to 101 kc., providing slow scanning speeds in one direction and speeds up to 100 kc. in the other direction. When it is desired to sector scan or to stop all scanning, the voltage control oscillator 51 is phase locked to the reference 100 kc. oscillator 41 through the phase lock loop comprising phase detector 55, low phase filter 57, and summer 59 as controlled by scan mode switch 52. In this case the center of the sector takes on the beam pointing direction $\phi_0$ determined by resolver 45. Sector sweep control 61 determines sector scan width and scan speed with its amplitude and frequency, respectively.

Each TWPS tube 63 as shown in FIGURE 3b can be shared between two antenna elements 65 and 67 since only one element is used at a time. Sharing is accomplished by the use of R-F switch 69 which can be of the ferrite type and serves as a single pole-double throw switch. R-F switch 69 is operated by threshold detector 85 which is shown as sensing the level of the $n$th channel programming signal. However, it can also sense a signal of a channel several channels adjacent. In the case of sector scan, threshold detector 85 and R-F switch 69 are locked by scan mode switch 84 which connects threshold detector 85 to switch lock potentiometer 46. Switch lock potentiometer 46, mechanically connected to the shaft of resolver 45 is a multiply tapped potentiometer that sets all R-F switches based only on the sector scan angular location. The programming signal from phase detector 49 is rectified by rectifier 83 since each tube is shared between diagonally opposite elements [cosine $(\phi_0-\phi_n)$ equals minus the cosine $$(\phi_0-\phi_n+180°)]$$

In this form it constitutes the programming signal for the tube for both R-F switch positions. The signal is then appropriately shaped and amplified by delay function generator 77 and gain function generator 79 to provide the delay and gain control voltages for the TWPS tube. The same rectified signal is used to sense when the tube is not a part of the active sector and turns the tube off with on-off control 81.

The outputs of all tubes are combined in summing feed 75 to obtain one R-F output from the entire antenna. This R-F signal can be switched by switch 73 (which can be a manual R-F four port switch) into video detector 87 or into external output 71. This external output might be connected to a power divider and spectrum analyzer, or to a tunable bandpass filter, or a signal recorder. The output of video detector 87 shown in FIGURE 3a is fed to video logarithmic amplifier 89 which can be DC coupled. It not only amplifies the video signal but compresses the range.

The display derives its X and Y axes inputs for the circular trace in the same manner as do the programming voltages. The two 100 kc. signals, suitably phased, are phase detected in display phase detector 91 and display phase detector 93 in combination with $\pi/2$ phase shifter 92. This generates cosine $\phi$ and sine $\phi$ voltages which are amplitude modulated identically by voltage variable gain controls 95 and 97 to obtain radial deflection on the display cathode ray tube. The modulation is controlled by the received R-F signal via the output of video logarithmic amplifier 89. Provision for expansion and offset is provided by gain control 99, mode selector 100, and angle control 105, and summers 101 and 103. The resultant sine $\phi$ and cosine $\phi$ signals are finally applied to X axis 107 and Y axis 109 of the display of the cathode ray tube. The offset voltages are obtained from sine and cosine potentiometer 105.

The display marker is obtained from display phase detectors 91 and 93 which compare their outputs with those of sine-cosine potentiometer 113 attached to azimuth pointing angle dial 111. The comparison is made by three coincidence detectors 115, 116, 117. At coincidence the dial readings agree with the beam pointing direction and the trace is intensified at Z axis display 119 producing a distinct spot on the display.

For the sector scan mode for which it is desired to achieve more angle resolution by lobing, the beam is lobed and the lobing signal from sector sweep control 61 is phased compared with the received signal from video logarithmic amplifier 89 in phase detector 106. This circuit can have a nulling meter on the front panel which the operator can null by adjusting the center of the scan sector via the resolver 45.

Figure 4:
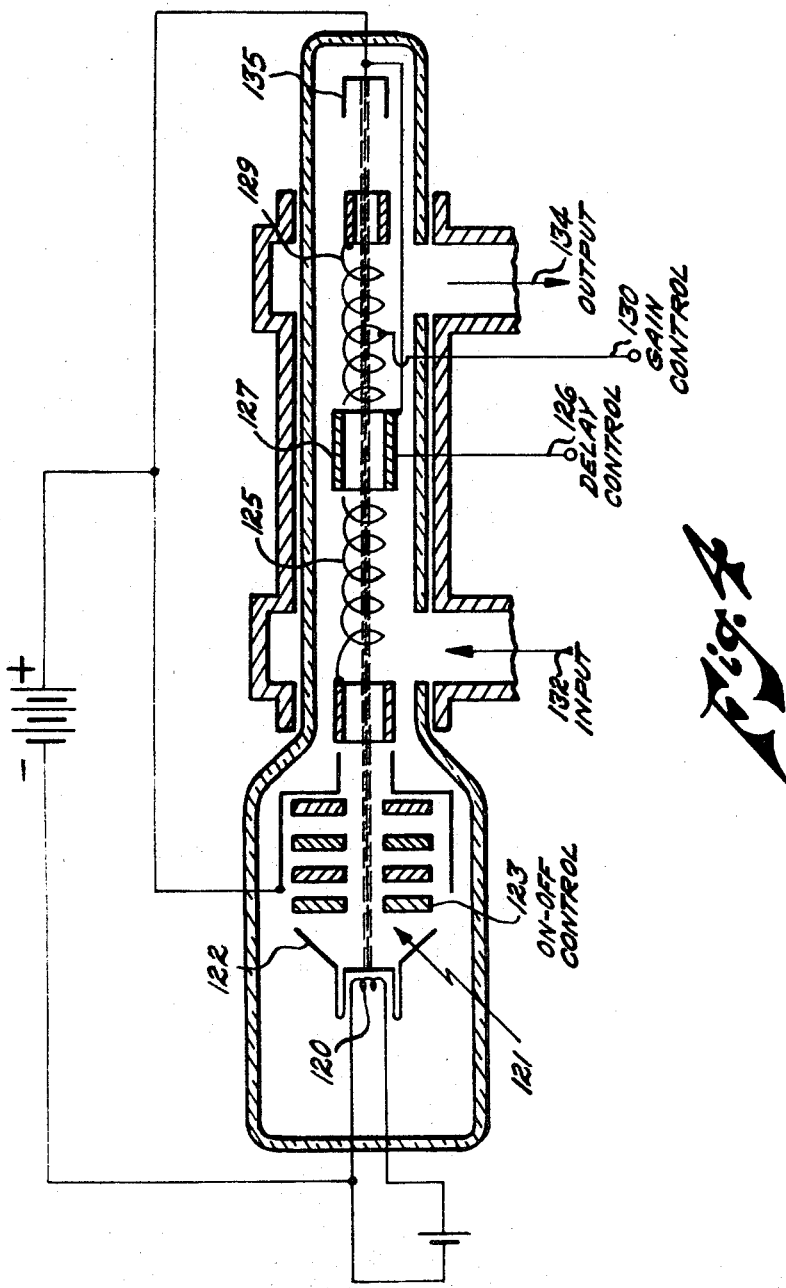
FIGURE 4 is a schematic diagram of the traveling wave phase shifter utilized in this invention.

A special traveling wave tube amplifier is used in this invention which provides both time delay control and gain control. The basic structure of this device is shown in FIGURE 4. It comprises low noise gun 121 which includes grid 123 that serves as an off-on control. Electrons are emitted at cathode at 122, heated by filament 120, and are collected at collector 135. Drift tube 127 is used as the time delay control which serves as a phase shifter and is controlled at delay control 126. The control of gain is obtained by the voltage on output helix 129 which is controlled at gain control 130. This method of control results in a minimum amount of noise figure degradation and a minimum amount of degradation of saturated output power. The input signal is applied at 132 to input helix 125 and the output is taken at 134 from output helix 129 which is shown using waveguides; however, direct coupling can also be used. The time delay variation is obtained principally by increase of drift tube voltage above its minimum value of approximately 1000 volts.

Although the invention has been described with reference to a particular embodiment, it will be understood to those skilled in the art that the invention is capable of a variety of alternative embodiments within the spirit and scope of the appended claims.

I claim:
1. A directional finding system comprising:
    (a) a plurality of antenna elements in circular configuration;
    (b) a plurality of traveling wave phase shifting tubes, one each connected to pairs of antenna elements, the elements of each pair being separated by 180°;
    (c) a plurality of switches interposed between each pair of antenna elements and the corresponding traveling wave phase shifting tube;
    (d) means for controlling the plurality of switches for connecting one of the antenna elements in each pair as the directional finding system scans;
    (e) means for controlling the delay and gain of the traveling wave phase shifting tubes simultaneously with maximum gain corresponding to maximum delay;
    (f) a summing circuit fed by the traveling wave phase shifting tubes; and
    (g) and means for displaying the output of the summing circuit presenting the output of the directional finding system as a function of azimuth.

2. A directional finding system according to claim 1 wherein the delay and gain controlling means include means for controlling said gain and delay in circular sequence for scanning.

References Cited
UNITED STATES PATENTS 3,109,174 10/1963 Plummer _____ 343—100
3,028,597 4/1962 Cicchetti et al. _____ 343—100

RODNEY D. BENNETT, JR., Primary Examiner

RICHARD E. BERGER, Assistant Examiner

U.S. Cl. X.R.
343—100, 106, 113